March 3, 1959          F. C. DULIN          2,875,513
METHOD OF RECONDITIONING A CONNECTING ROD ASSEMBLY
Filed Nov. 9, 1953          4 Sheets-Sheet 1
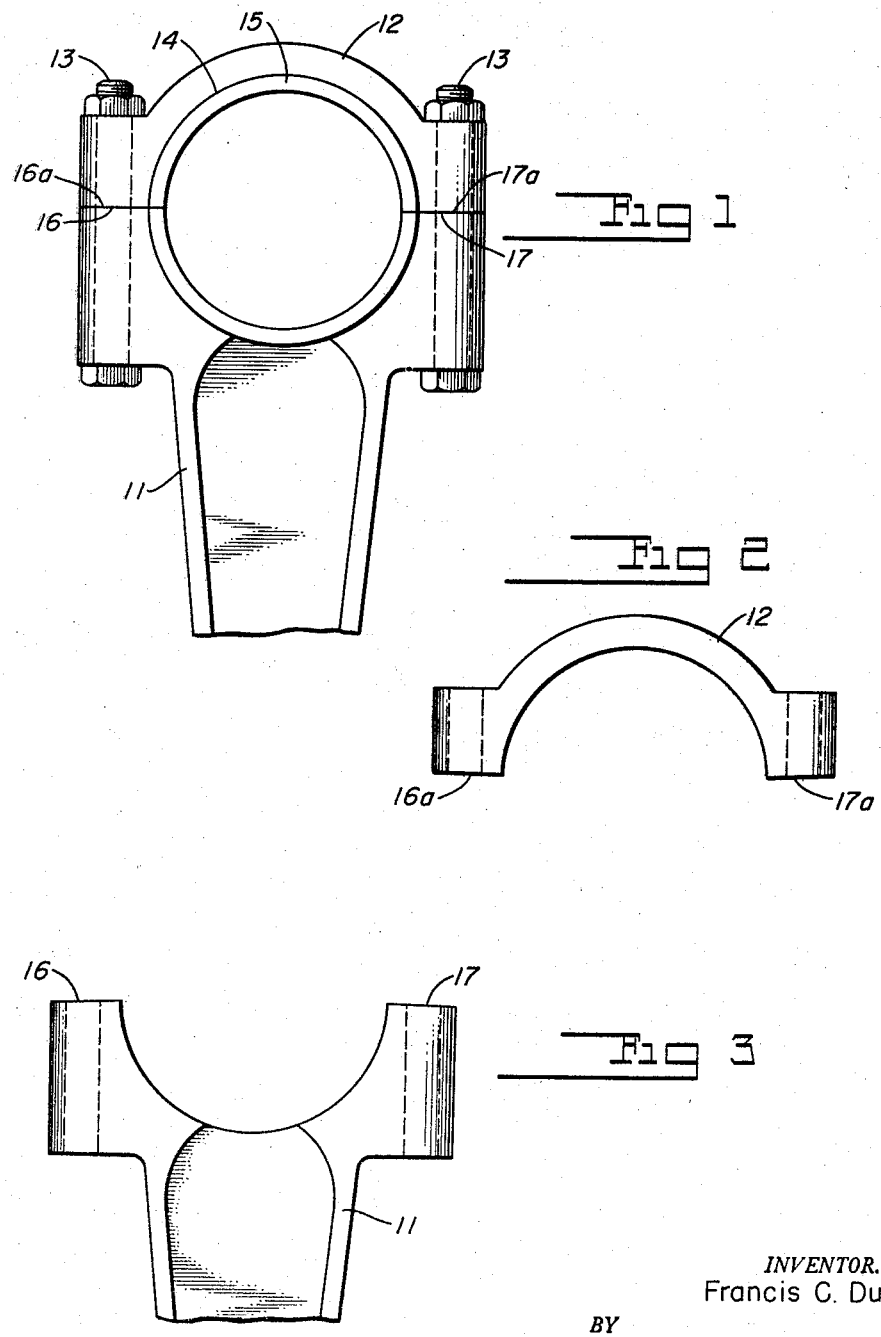
INVENTOR.
Francis C. Dulin
BY
ATTORNEYS.

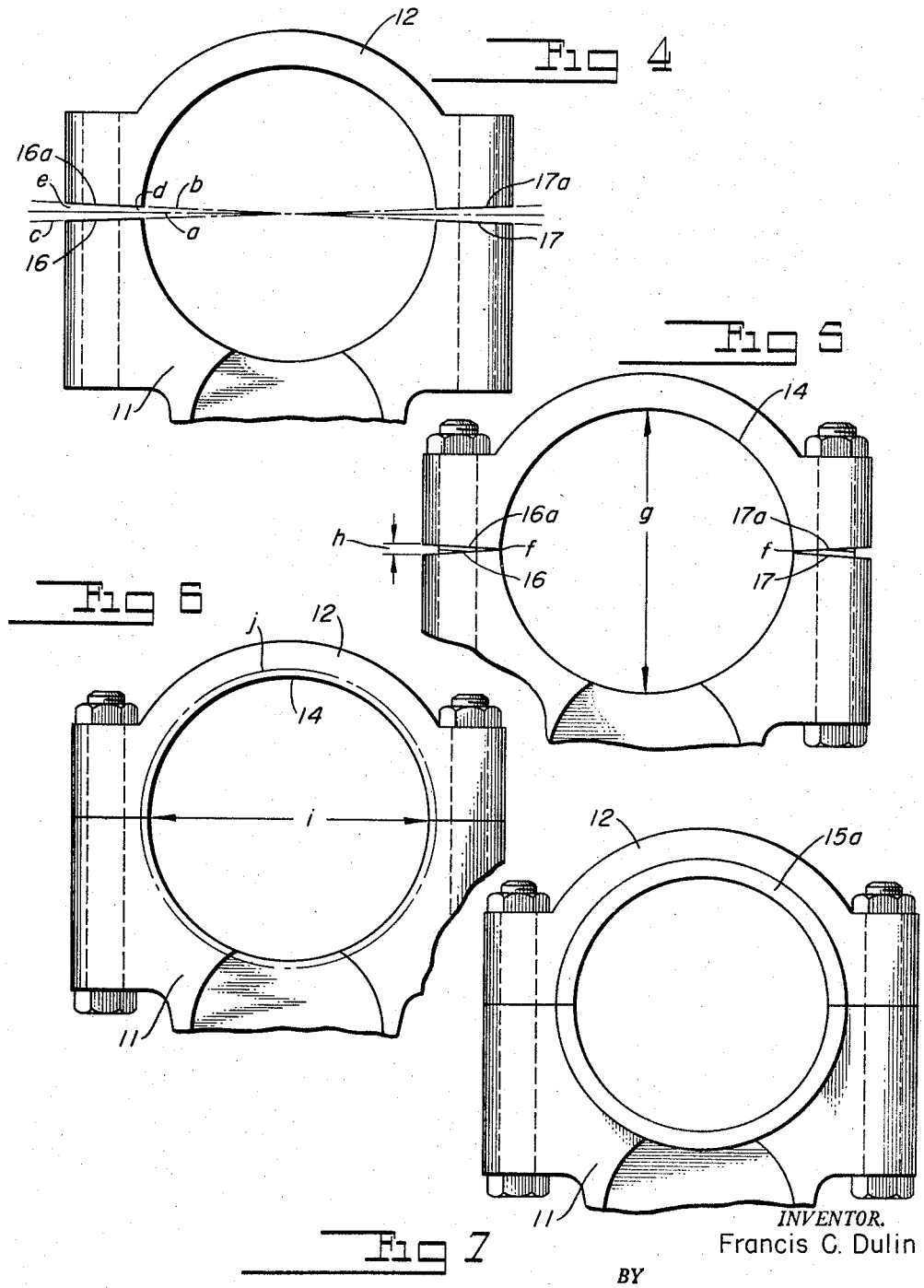

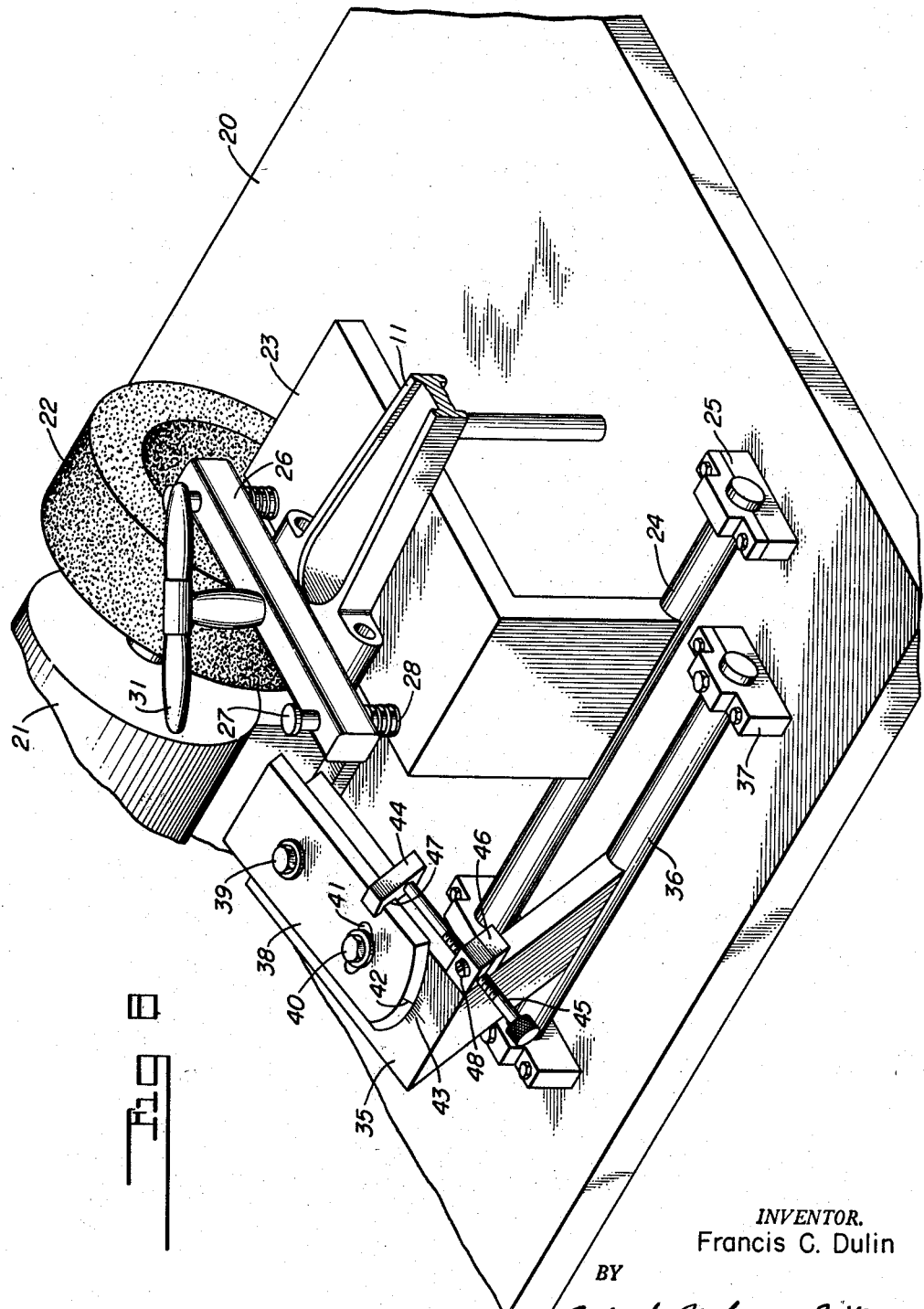

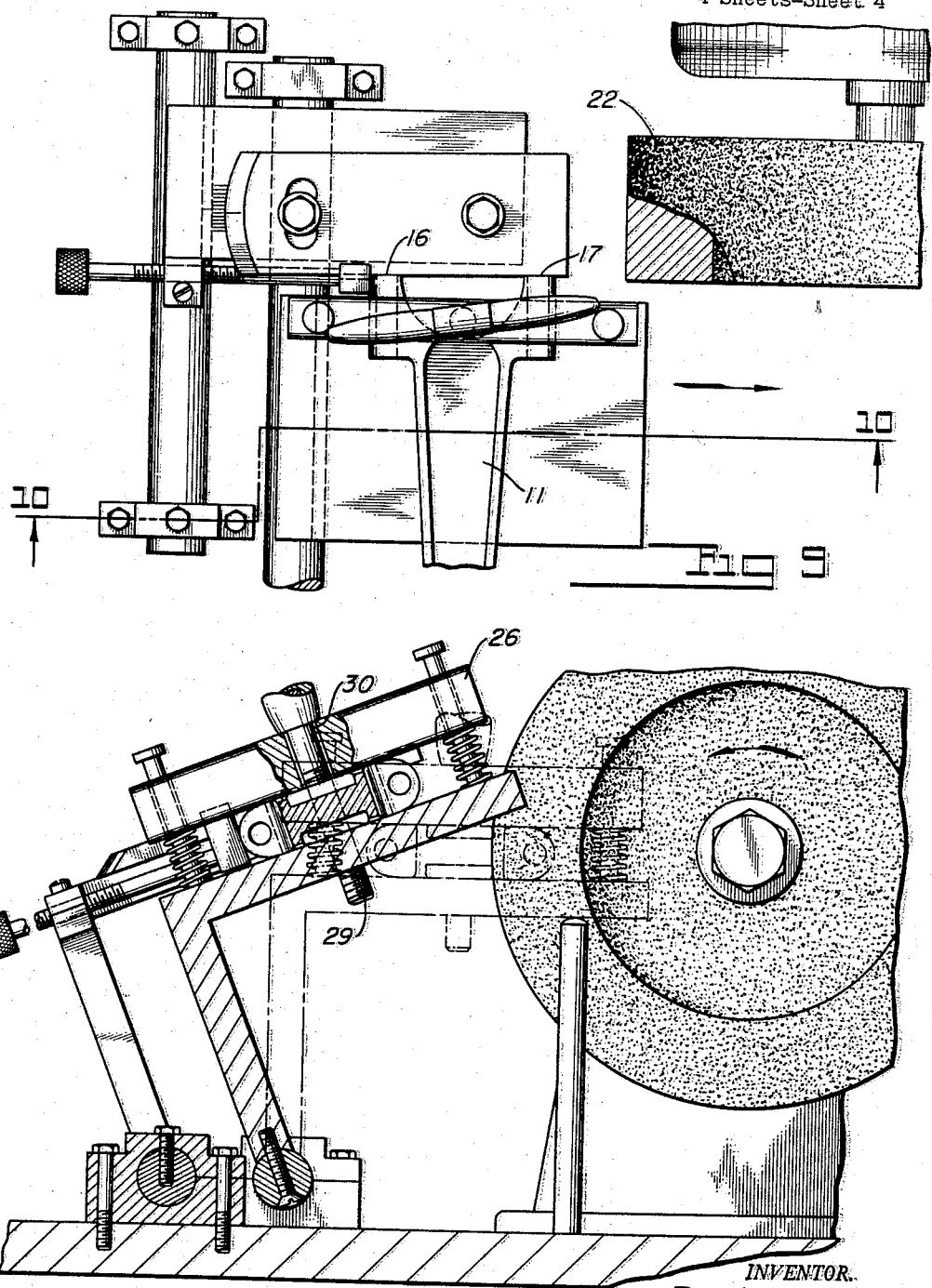

United States Patent Office 2,875,513
Patented Mar. 3, 1959

2,875,513

METHOD OF RECONDITIONING A CONNECTING ROD ASSEMBLY

Francis C. Dulin, Columbus, Ohio, assignor to Thompson Products, Inc., Cleveland, Ohio, a corporation of Ohio Application November 9, 1953, Serial No. 391,041

9 Claims. (Cl. 29—401)

My invention relates to a method of reconditioning a connecting rod assembly. It has to do, more specifically, with a method and machine which is used to recondition the bearing-receiving recess or socket in a connecting rod after the worn or damaged bearing is removed therefrom so that the recess or socket will be of a precise size for receiving a replacement bearing.

To recondition the bearing-receiving recess or socket in a connecting rod after the worn or damaged bearing is removed, it is necessary to decrease the diameter of the recess or socket after the bearing is removed so that it can be rebored and reground to a precise size to receive a bearing of standard size. At the present time, it is customary to separate the cap and body sections of a connecting rod, remove the worn bearing halves from the connecting rod body and cap, remove some material from the flat parting surfaces of the cap and body to reduce the dimension of the recess in a direction axially of the rod, bolt the cap on the body, and then reduce the dimension of the recess at right angles to the first direction by pressure on the cooperating cap and body end which will distort these members transversely. This will provide stock at the wall of the recess or socket which can be removed to permit reboring and regrinding to a proper size to receive the standard replacement bearing. Obviously, distorting the cap and body by pressure is damaging to these members and to the bolts which connect them, lacks accuracy, and sometimes after removal of pressure, these members spring back to their original size which results in insufficient stock for reboring and regrinding.

It is the object of my invention to provide a simple, inexpensive, efficient and effective method for reconditioning the bearing-receiving recess in a cooperating connecting rod and cap to provide stock for regrinding and reboring the recess, the method being such that the bearing rod and cap are not damaged and the wall of the recess is provided with sufficient additional stock that can be removed to provide a recess of exact size to receive a standard replacement bearing.

Another object of my invention is to provide a simple, efficient machine for use in performing the method indicated above.

In the accompanying drawings I have illustrated the method of my invention and apparatus which is useful in performing it. In these drawings:

Figure 1 is an elevational view showing a connecting rod with a worn bearing therein which is to be replaced.

Figure 2 shows the cap with its parting surfaces ground at an angle in accordance with my method.

Figure 3 shows the connecting rod forging with its parting surfaces ground at an angle in accordance with my method.

Figure 4 is a diagrammatic view showing how the removal of material at the parting surfaces will provide the necessary additional stock at the wall of the recess to provide for reboring and regrinding the recess.

Figure 5 is a view showing the angularly ground parting surfaces of the cap and body in contact with each other.

Figure 6 shows the cap drawn onto the body so that the angularly ground parting surfaces of the two members are in flat contact.

Figure 7 shows the rebored and reground recess with the replacement bearing therein.

Figure 8 is a perspective view of a machine which is suitable for grinding the parting surfaces of the connecting rod cap and body.

Figure 9 is a plan view of the machine of Figure 8.

Figure 10 is a transverse vertical sectional view taken along line 10—10 of Figure 9.

With reference to the drawings, I have illustrated in Figure 1 a connecting rod forging 11 and a cap 12 held in cooperative relationship in the usual manner by the bolts 13. These cooperating members provide the usual bearing-receiving circular recess 14 which receives the bearing 15. These bearings 15 are always made in two halves, one of which snaps into the member 11 and the other of which snaps into the member 12. The member 11 has the parting surfaces 16 and 17 and the member 12 has the parting surfaces 16a and 17a. When bolted together the surfaces 16a and 17a are in flat contact with the respective surfaces 16 and 17. In this instance, it is to be assumed that the bearing 15 is worn and is to be replaced.

To replace the worn bearing 15 with a new bearing, according to my method, the bolts 13 are removed and the worn bearing halves are withdrawn from the respective cooperating members 11 and 12. Then the parting surfaces 16 and 16a and 17 and 17a are prepared in a special manner according to my invention.

As shown in Figure 2, the parting surfaces 16a and 17a of the cap 12 are ground at an angle so that each surface extends outwardly and upwardly. As shown in Figure 3, the parting surfaces 16 and 17 of the body forging 11 are ground at an angle so that each surface extends downwardly and outwardly. The angles of the surfaces 16a and 17a are the same as the angles of the surfaces 16 and 17 but extend in a reverse direction. The result is that when the cap 12 is positioned on the forging 11, as shown in Figure 4, the surfaces 16 and 16a are in outwardly diverging relationship and the surfaces 17 and 17a are in similar diverging relationship.

The manner in which the surfaces are ground and their relationship is indicated in Figure 4. The diameter line $a$ indicates the original plane along which the parting surfaces 16 and 16a and 17 and 17a contact with each other. The line $b$ indicates the disposition of the angular surfaces 16a and 17 and the line $c$ indicates the disposition of the surfaces 16 and 17a. It will be noted that a thickness of material, indicated by the letter $d$, is removed from each parting surface at its inner edge and the thickness of material removed gradually increases outwardly to the thickness indicated by the letter $e$ at the outer edge of each surface.

The members 11 and 12, with their parting surfaces ground as indicated, are then reassembled as shown in Figure 5. The result will be that the surfaces 16 and 16a will be in diverging relationship and the surfaces 17 and 17a will be in diverging relationship but will contact at their inner edges at the points indicated by the letters $f$. At this time, the vertical dimension of the recess 14, indicated by the arrow $g$, will be less than the original vertical dimension of the recess being smaller by twice the amount of the material $d$ removed from each parting surface at its inner edge. The angle of each parting surface is selected so that the spacing of the surfaces 16 and 16a and 17 and 17a at their outer edges where they diverge to the greatest extent, indicated by the letter $h$, is approximately twice that of the thickness of material $d$ removed from each surface at its inner edge. Thus, when the bolts 13 are tightened to pull the cap 12 down onto member 11, the surfaces 16 and 16a and the surfaces 17 and 17a will pivot together about the points $f$. This will move the sides of the recess 14 inwardly so that the horizontal dimension of the recess 14, at right angles to the dimension $g$, and indicated by the arrow $i$, will correspond to the vertical dimension $g$. As shown by a comparison of the wall of the recess 14 in Figure 6 with the curved line $j$, which indicates the original position of the wall of the recess, the recess wall has been moved inwardly by a thickness corresponding to twice the thickness $d$ or corresponding to the dimension $h$.

After the cap member 12 and forging 11 are assembled and bolted together as indicated in Figure 6, the recess 14 may then be rebored and reground to a precise size to receive a standard bearing. Then, as indicated in Figure 7, the new bearing 15a may be positioned therein.

It will be understood that the angles of the parting surfaces are exaggerated in the drawings for the purpose of illustration. The bolts 13 of the reconditioned connecting rod will be flexed slightly when the cap 12 is clamped on member 11 but not enough to have any undesirable effect.

In Figures 8, 9 and 10, I have illustrated a machine which may be used for grinding the parting faces 16 and 16a and 17 and 17a. This machine comprises a base plate 20 which carries the driving motor 21 that drives a grinding wheel 22. The wheel 22 rotates in a vertical plane extending forwardly and rearwardly and spaced from the sides of the base plate 20. A workpiece holder is provided for positioning the work in association with the wheel 22. This holder comprises an L-shaped arm 23, the depending forward end of which is carried by a pivot shaft 24 that is parallel to the axis of the wheel 22. This shaft 24 is rotatably mounted in the bearing units 25 secured to the base plate 20. A clamp is provided for clamping the work to the upper surface of the arm 23 and consists of a clamping bar 26 which is slidably carried by vertical pins 27 fastened to the member 23. Compression springs 28 surround the pins 27 and normally force the bar 26 upwardly against the heads of the pins. To move the bar 26 downwardly into clamping relationship with the workpiece, which is shown as the forging 11, a screw 29 is threaded into member 23 and extends loosely through an opening 30 in the bar 26. Non-rotatably secured to the upper end of the screw 29 is an operating handle 31. By means of this handle the screw 29 may be rotated to force the bar 26 downwardly into clamping relationship to the workpiece.

The member 23 is so positioned axially relative to the grinding wheel 22 that when it is swung about the axis of the shaft 24 in a rearward direction, as shown in Figure 9, its inner edge will pass in closely spaced parallel relationship to the face of the grinding wheel 22.

In order to provide for grinding the workpiece at the proper angle, a gauge structure is provided. This gauge structure comprises the L-shaped supporting arm 35 which is fixed on a transverse rod 36 disposed in parallel relationship to the shaft 24, forwardly thereof, and clamped in rigid position to the base plate 20 by means of the clamping pillow blocks 37. The clamping blocks may be released to permit rotation of rod 36 therein and forward or rearward adjustment of arm 35. The upper surface of the member 35 carries a gauge plate 38 which is pivoted thereto by a vertical pivot 39. This gauge plate may be swung about its pivot 39 to any desired angle and is clamped in adjusted position by means of a clamping screw 40 which passes through an arcuate slot 41 in the plate 38 and into the arm 35. The forward end of the plate 38 is provided with an index mark 42 which cooperates with a scale 43 on the member 35.

Associated with the inner edge of the gauge plate 38 is a stop 44 which is carried by a screw 45 that is threaded through a block 46 on the inner edge of member 35. This block 46 is provided with a notch 47 at its inner edge so as not to interfere with adjustment of gauge plate 38. By means of screw 45, the stop 44 may be moved along the plate 38 and it is held in fixed position by means of a set screw 48 threaded through block 46.

In grinding the parting surfaces, the cap 12 or the forging 11 is clamped in the machine. For illustration, I have shown the member 11 clamped on the machine but the cap can be clamped thereon in the same manner. One parting surface is ground in each operation and, consequently, there will be a total of four grinding operations to prepare all of the parting surfaces. To obtain the angular surface, the workpiece 11 is clamped in an angular position on the arm 23. To establish the proper angular relationship, the gauge plate 38 is positioned at the desired angle and the stop 44 is properly positioned along the gauge plate. Then the arm 23 is swung forwardly and the forward edge of the workpiece 11 is contacted with the stop 44 and the inner end of the workpiece 11, including its surfaces 16 and 17, is contacted with the inner edge of the gauge plate 38. Then the workpiece is clamped on the arm 23 in this established angular position. If the arm 23 is now swung rearwardly, the rearwardmost parting surface, that is the surface 17, will pass across the face of the grinding wheel 22, as indicated in Figure 9, and this surface 17 will be ground at the proper angle. To grind the surface 16, the workpiece 11 will be removed, reversed and replaced with the surface 16 in the position formerly occupied by the surface 17. Then, the cap 12 may have both of its surfaces 17a and 16a ground in the same manner. The result will be that all the parting surfaces will be properly ground for use in my method as previously described.

It will be apparent that I have provided a simple yet effective method for reconditioning the bearing-receiving recess in a cooperating connecting rod and cap to provide stock for regrinding and reboring the recess. The method is such that the bearing rod and cap are not damaged and the wall of the recess is provided with sufficient additional stock that can be removed precisely to provide a recess of exact size to receive a standard replacement bearing.

Having thus described my invention, what I claim is:

1. The method of reconditioning a member and more particularly a recess formed by opposed portions of the member which portions are provided with parting surfaces normally held in contact with each other which comprises beveling the cooperating parting surfaces in diverging relationship away from the recess, remating the parting surfaces so that the diameter of the damaged recess is reduced to provide additional stock at the wall of the recess, and refinishing the opposed portions including the additional stock at the perimeter of the recess to restore the recess and thereby recondition the member.

2. The method of reconditioning a member and more particularly a recess formed by opposing portions which are provided with parting surfaces normally held in contact with each other which comprises angularly grinding the cooperating parting surfaces in diverging relationship laterally of and away from the recess, clamping and mating the parting surfaces to reduce the diameter of the recess and refinishing the recess to restore the recess and thereby recondition the member.

3. In a method of reconditioning a recess for receiving a bearing which recess is defined by and disposed between a body and a cap with the body and cap having mated pairs of parting surfaces, the steps of refinishing the parting surfaces so that when the parting surfaces are remated the recess will assume a circular configuration, and remating the refinished parting surfaces thereby providing a circular recess.

4. In a method of reconditioning a recess for receiving a bearing which recess is defined by and disposed between a body and a cap with the body and cap having mated pairs of parting surfaces, the steps of refinishing the parting surfaces by reducing the diameters of the recess so that when the parting surfaces are remated the recess will assume a circular configuration, remating the refinished parting surfaces thereby providing a circular recess, and reboring the recess so that the recess will be restored to its original condition prior to ever being used.

5. The method of reconditioning a wall area defining a recess for receiving a bearing with the recess disposed between a cap and a body with the cap and body having pairs of parting surfaces normally held in abutting contact with each other which comprises angularly refinishing the parting surfaces with the parting surfaces in each pair diverging outwardly away from the recess, and remating the diverging parting surfaces to reduce the diameters including the horizontal and the vertical diameters of the recess for receiving a bearing thereby providing additional stock at the wall area of the recess so the wall area defining the recess may be refinished.

6. The method of claim 5 wherein the cap is provided at each side with a parting surface which cooperates with a similar parting surface on the body, the two parting surfaces being refinished at such angles that they contact at the wall of the recess and diverge outwardly.

7. The method of claim 6 wherein some of the material is removed at the points where the two surfaces contact so that the vertical diameter of the recess will be decreased.

8. The method of claim 7 wherein the spacing of the parting surfaces at their point of greatest divergence is twice the thickness of the amount of material removed from each parting surface at its point of contact with the other surface so that the horizontal diameter of the recess will be reduced the same amount as the said vertical dimension.

9. The method of claim 8 wherein the recess is reground and rebored to proper size to receive a replacement bearing.

References Cited in the file of this patent

UNITED STATES PATENTS

| | | |
|---|---|---|
| 1,905,784 | Alsaker et al. | Apr. 25, 1933 |
| 1,918,020 | Dodge | July 11, 1933 |
| 2,032,538 | Kulp et al. | Mar. 3, 1936 |
| 2,269,556 | St. Clair | Jan. 13, 1942 |
| 2,607,173 | Garrison | Aug. 19, 1952 |
| 2,724,932 | Wagner | Nov. 29, 1955 |